United States Patent [19]

Kiel

[11] Patent Number: 5,277,484
[45] Date of Patent: Jan. 11, 1994

[54] RELAY VALVE ARRANGEMENT

[75] Inventor: Bernd Kiel, Wunstorf, Fed. Rep. of Germany

[73] Assignee: Wabco Standard GmbH, Hanover, Fed. Rep. of Germany

[21] Appl. No.: 965,742

[22] Filed: Oct. 23, 1992

[30] Foreign Application Priority Data

Nov. 2, 1991 [DE] Fed. Rep. of Germany ....... 4136244

[51] Int. Cl.⁵ .......................... B60T 8/36; F16K 31/06
[52] U.S. Cl. .................................. 303/118.1; 303/40; 303/119.2
[58] Field of Search ............... 303/119.2, 119.1, 118.1, 303/40, 28-40; 137/627.5, 596.17; 251/129.01, 129.02, 129.03, 129.07, 129.15, 129.18, 129.22, 129.21

[56] References Cited

U.S. PATENT DOCUMENTS

| | | | |
|---|---|---|---|
| 3,818,927 | 6/1974 | Zeuner | 251/129.02 X |
| 3,820,856 | 6/1974 | Adahan | 303/118.1 X |
| 3,823,987 | 7/1974 | Kurichh | 303/118.1 |
| 3,829,060 | 8/1974 | Menar | 251/129.02 |
| 3,881,779 | 5/1975 | Machek | 303/118.1 |
| 3,970,111 | 7/1976 | Brune et al. | 303/118.1 X |
| 4,077,674 | 3/1978 | Doto | 251/129.17 X |
| 4,557,527 | 12/1985 | Stumpe | 303/118.1 |
| 5,118,169 | 6/1992 | Moller | 303/118.1 |
| 5,167,442 | 12/1992 | Alaze et al. | 303/119.2 X |

FOREIGN PATENT DOCUMENTS 8619384.8 10/1986 Fed. Rep. of Germany .

OTHER PUBLICATIONS

Brochure, Wabco Westinghouse Fahrzeugbremsen GmbH, Device No. 472 195 020 0.

Primary Examiner—Douglas C. Butler
Attorney, Agent, or Firm—Meltzer, Lippe, Goldstein

[57] ABSTRACT

A relay valve arrangement useful in an ABS system comprises a relay valve, a source of control pressure, a control pressure circuit, a control chamber which receives the control pressure from the control pressure circuit and thereby determines the configuration of the relay valve, a control valve through which the control pressure is delivered to the control chamber, and a return valve connecting the control chamber to the control pressure circuit so as to by-pass the control valve to deaerate the control chamber when the control pressure in the control chamber is greater than the control pressure in the control pressure circuit. The control valve includes a solenoid-actuated inlet valve having an armature, and a solenoid-actuated outlet valve. The return valve is designed so that at least part of it constitutes an armature support for the armature of the solenoid-actuated inlet valve and is coaxial with this armature.

10 Claims, 3 Drawing Sheets

RELAY VALVE ARRANGEMENT

BACKGROUND OF THE INVENTION

The invention relates to a relay valve arrangement which can be used in the ABS system of a vehicle.

A relay valve arrangement of this type is marketed by WABCO Westinghouse Fahrzeugbremsen GmbH under Device No. 72 195 020 0. This relay valve arrangement is designed to carry out three modes of operation during ABS-controlled braking: pressure increase, pressure hold, and pressure decrease. The relay valve arrangement includes an inlet chamber for a working pressure fluid (hydraulic or pneumatic), a work chamber, an outlet through which the working pressure fluid is delivered to a brake cylinder, an outlet to exhaust, and a combined inlet-and-outlet valve which includes a relay piston. The position of the relay piston determines which mode of operation is carried out. The relay valve arrangement further includes a control chamber which controls the position of the relay piston. The control chamber is aerated with a control pressure fluid through a solenoid-actuated inlet valve and deaerated through a solenoid-actuated outlet valve.

In a relay valve arrangement of this type, it may occur that the solenoid-actuated outlet valve does not reach its open position to deaerate the control chamber rapidly enough in the pressure holding mode (working pressure inlet and outlet valves of the relay valve closed) when the pressure drops rapidly in a control pressure circuit which delivers the control pressure fluid to the control chamber.

The delayed response of the solenoid-actuated outlet valve is due to the fact that an electronic regulating circuit interacting with the relay valve arrangement of a vehicle equipped with an ABS regulating system is unable to recognize immediately when the driver of the vehicle lifts his foot from the brake pedal and thereby deaerates the control pressure circuit leading to the solenoid-actuated inlet valve of the relay valve arrangement in order to terminate the braking process. Only when the braking pressure supplied by the relay valve arrangement to the brake cylinders on the basis of the control pressure still present in the control chamber causes further deceleration of the vehicle wheels and when locking tendencies of the vehicle wheels are recognized by the electronic regulating circuit does said electronic regulating circuit transmit a signal to the solenoid-actuated outlet valve. The latter then assumes its open position and the control chamber is deaerated. The relay piston then brings the outlet valve of the combined inlet-and-outlet valve of the relay valve arrangement into open position and the brake cylinders of the vehicle are deaerated.

The consequences of the delayed response of the solenoid-actuated outlet valve are a delayed start of pressure drop in the control chamber and thereby also a delayed reaction of the relay piston, resulting in a delayed braking pressure drop in the brake cylinders, and this in turn delays a desired end of the braking process.

In order to deal with this circumstance, a return valve is installed between the control pressure circuit and the control chamber, said return valve being held in closed position when control pressure is present in the control pressure circuit and which is brought by the pressure in the control chamber into its open position when the pressure drops in the control pressure circuit. As the delivery of control pressure to the control pressure circuit via a control pressure coupling drops, the pressure also begins to drop in the control chamber as a result of this measure even before the solenoid-actuated outlet valve opens. Thus, dead time no longer occurs between pressure drop in the control pressure circuit and the pressure drop in the control chamber.

In the known relay valve arrangement, the return valve is installed in a housing wall between the control chamber and the control pressure circuit (which actually constitutes a channel in this wall) connected to the control pressure coupling.

Such an arrangement of the return valve however requires various costly measures and means. A stepped bore must be provided in the housing wall to receive the return valve. Special retaining means must be provided to hold the return valve in the bore. Special sealing means must also be provided.

In a known relay valve arrangement of this type, it is furthermore required that an armature support be provided for the armature of the solenoid-actuated inlet valve and that the support be designed so that the pressurized fluid (i.e., hydraulic fluid or pneumatic air) be able to reach below the armature in order to accelerate the movement of the armature during the closing process of the solenoid-actuated inlet valve.

It is the object of the instant invention to provide an improved relay valve arrangement of the type discussed in such manner that the arrangement and the design of the return valve are simplified.

SUMMARY OF THE INVENTION

In accordance with the present invention, a relay valve arrangement useful in an ABS system comprises a relay valve, a source of control pressure, a control pressure circuit, a control chamber which receives the control pressure from the control pressure circuit and thereby determines the configuration of the relay valve, a control valve through which the control pressure is delivered to the control chamber, and a return valve connecting the control chamber to the control chamber so as to by-pass the control valve to deaerate the control chamber when the control pressure in the control chamber is greater than the control pressure in the control pressure circuit. The control valve includes a solenoid-actuated inlet valve having an armature, and a solenoid-actuated outlet valve. The return valve is designed so that at least part of it constitutes an armature support for the armature of the solenoid-actuated inlet valve and is coaxial with this armature.

The invention offers in particular the advantage that by combining the return valve and the armature support for the solenoid-actuated inlet valve into one structural unit, the need for the preparation of two locations for the return valve and for the armature support in the relay valve arrangement no longer exists.

The support of the armature is preferably made of a non-metallic material such as plastic or rubber. This measure advantageously prevents a metal armature from sticking to the armature support.

Adhesion of the armature to a metal support is caused by simultaneous low temperature and humidity.

Advantageously, the return valve includes a sealing element which snaps into a circumferential groove of the armature support.

BRIEF DESCRIPTION OF THE DRAWINGS

The invention is explained in greater detail below through the drawings in which.

DETAILED DESCRIPTION OF PREFERRED EMBODIMENTS

Figure 1:
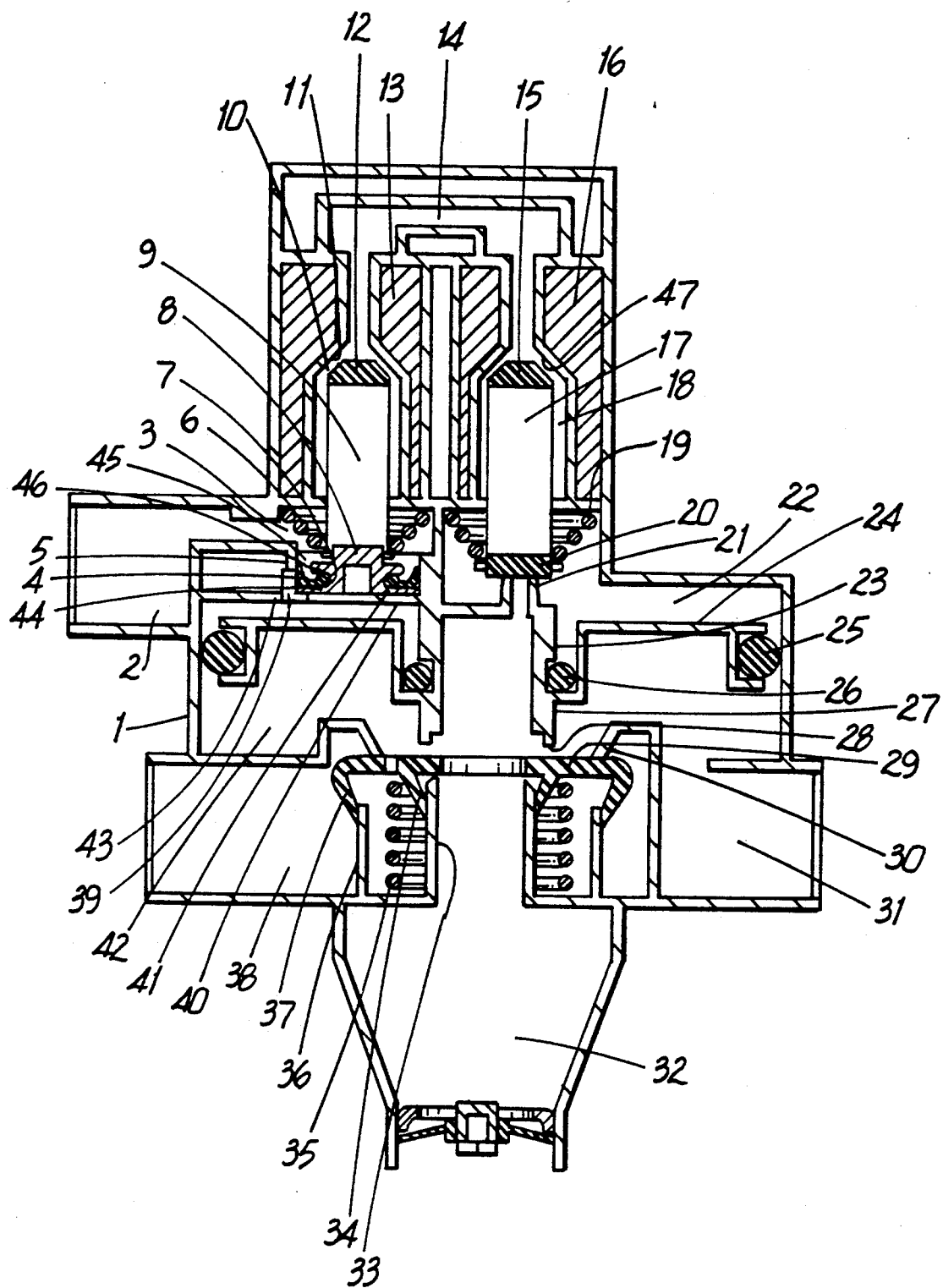
FIG. 1 shows the inventive relay valve arrangement having two solenoid-actuated valves serving to regulate the control pressure in a control pressure chamber, and a return valve installed between the control pressure chamber and a control pressure circuit.

FIG. 1 shows a relay valve arrangement having a housing (1) in which a relay piston (24) of a relay valve is installed, is sealed off by means of two sealing rings (25) and (26) and is movable in the direction of the longitudinal axis of the housing (1). The relay piston (24) separates a control chamber (22) from a work chamber. (42). A pressure outlet (31) leading to a brake cylinder follows the work chamber (42). The work chamber (42) can be connected selectively, i.e., as a function of the position of relay piston (24), via a combined inlet-and-outlet valve (30, 29, 28) of the relay valve to a pressure inlet chamber (38) connected to a pressure supply (not shown), or to an outlet (32) leading to a pressure sink, or it can be closed off against both. In a device running on compressed air, the pressure sink is the atmosphere and in a device running on hydraulic pressure, the pressure sink is a runback (liquid supply container).

A profiled element serving as a sealing element (29) which also constitutes a valve body of the combined inlet-and-outlet valve (30, 29, 28) is circumscribed by two cylindrical projections (34) and (37) which together with the two circumscribing projections (33) and (36) of housing (1) constitute a guide for the sealing element (29).

The sealing element (29) is pressed by a spring (35) against an inlet valve seat (30) which is part of the housing (1). A pipe-shaped stepped-down extension (27) of the relay piston (24) extending towards the sealing element (29) constitutes an outlet valve (28) together with its free end.

Another pipe-shaped element (23) of a wall (43) of housing (1) delimiting the control chamber (22) extends into the pipe-shaped extension (27) of the relay piston (24). The gap between the outer circumference of the pipe-shaped element (23) of the wall (43) and the inside wall of the pipe-shaped extension (27) of the relay piston (24) is sealed by means of the sealing ring (26).

The control chamber (22) can be put under pressure from a source of control pressure via a control pressure coupling (2), a control pressure circuit (3), a first channel (10), a second channel (14) following this channel, and a third channel (18) connected to the latter. The control pressure circuit (3) takes the form of a chamber in the area of the inlet valve portion of a solenoid-actuated control valve.

The first channel (10) is formed between ribs extending in the direction of the longitudinal axis of a first coil support and the outer circumference of an armature (9) of a solenoid inlet valve, or by grooves worked into the outer circumference of the armature (9) and extending in its longitudinal direction. Similarly, the third channel (18) is formed between ribs extending in the longitudinal direction of a second coil support and the outer circumference of an armature (17) of a combined solenoid inlet/outlet valve, or by grooves worked into the outer circumference of the armature (17) and extending in its longitudinal direction.

The combined solenoid inlet/outlet valve comprises the second coil support with a coil (16), the armature (17), a first sealing element (20) on the armature (17) interacting with an outlet valve seat (21) which is mounted on the pipe-shaped element (23) of wall (43) of housing (1), and a second sealing element (15) on the armature (17) interacting with an inlet/outlet valve seat (47), wherein the inlet/outlet valve seat (47) faces the outlet valve seat (21). The armature (17) together with its first sealing element (20) is held by means of a spring (19) on the outlet valve seat (21) which assumes at the same time the function of an armature support.

The solenoid inlet valve comprises the first coil support with a coil (13), the armature (9) having a sealing element (12), and an inlet valve seat (11). The inlet valve seat (11) is part of the first coil support and is situated between the first channel (10) and the second channel (14).

The solenoid inlet valve (9, 11, 12, 13) and the combined solenoid inlet/outlet valve (17, 15, 47, 20, 21, 16) together constitute a control valve regulating the control pressure introduced into the control chamber (22). A spring (6) holds the armature (9) of the solenoid inlet valve (9, 11, 12, 13) on an armature support (8, 41, 7, 46). The armature support (8, 41, 7, 46) is made of a nonmetallic material such as rubber or plastic. The armature support (8, 41, 7, 46) is held in a recess (45) of the wall (43) of housing (1) and is coaxial with the armature (9), has a bottom and is surrounded by a wall.

The armature support (8, 41, 7, 46) is provided with a surrounding groove (7) in which a grooved ring (44, 4) is placed. An outer lip (4) of the grooved ring (44, 4) together with the outer circumferential surface of its free end zone is in sealing contact with a wall (5) surrounding the recess (45) whereby the armature support (8, 41, 7, 46) is laterally seated. The grooved ring (44, 4) together with the armature support (8, 41, 7, 46) and the wall (5) constitute a return valve (44, 4, 5, 8, 41, 7, 46) for the relay valve arrangement.

The grooved ring (44,4) is placed so that the opening of its groove faces towards the control pressure circuit (3) (inlet chamber) of the solenoid inlet valve (13, 9, 12, 11). Thereby, the return valve (44, 4, 5, 8, 41, 7, 46) is in closed position when the control pressure circuit (3) (inlet chamber) is without pressure and the control chamber (22) is without pressure, or when pressure is present in the control pressure circuit (3) (inlet chamber) and in the control chamber (22). The return valve (44, 4, 5, 8, 41, 7, 46) is placed in open position only when pressure is present in the control chamber (22) and when the control pressure circuit (3) (inlet chamber) of the solenoid inlet valve (13, 9, 12, 11) is deaerated through the control pressure coupling (2) and through a valve upstream of the latter such as a pedal-operated brake valve, said solenoid inlet valve (13, 9, 12, 11) being closed.

The bottom (40) of the recess (45) of the armature support (8, 41, 7, 46) and of the return valve (44, 4, 5, 8, 41, 7, 46) delimiting said recess (45) is provided with a passage (39) extending from the control chamber (22) to the return valve (44, 4, 5, 8, 41, 7, 46). The ring-shaped element (41) of the armature support (8, 41, 7, 46) has a smaller diameter than the recess (45) so that compressed air flowing out of the control chamber (22) is able to reach the sealing lip (4) of the grooved ring (44,4).

Figure 2:
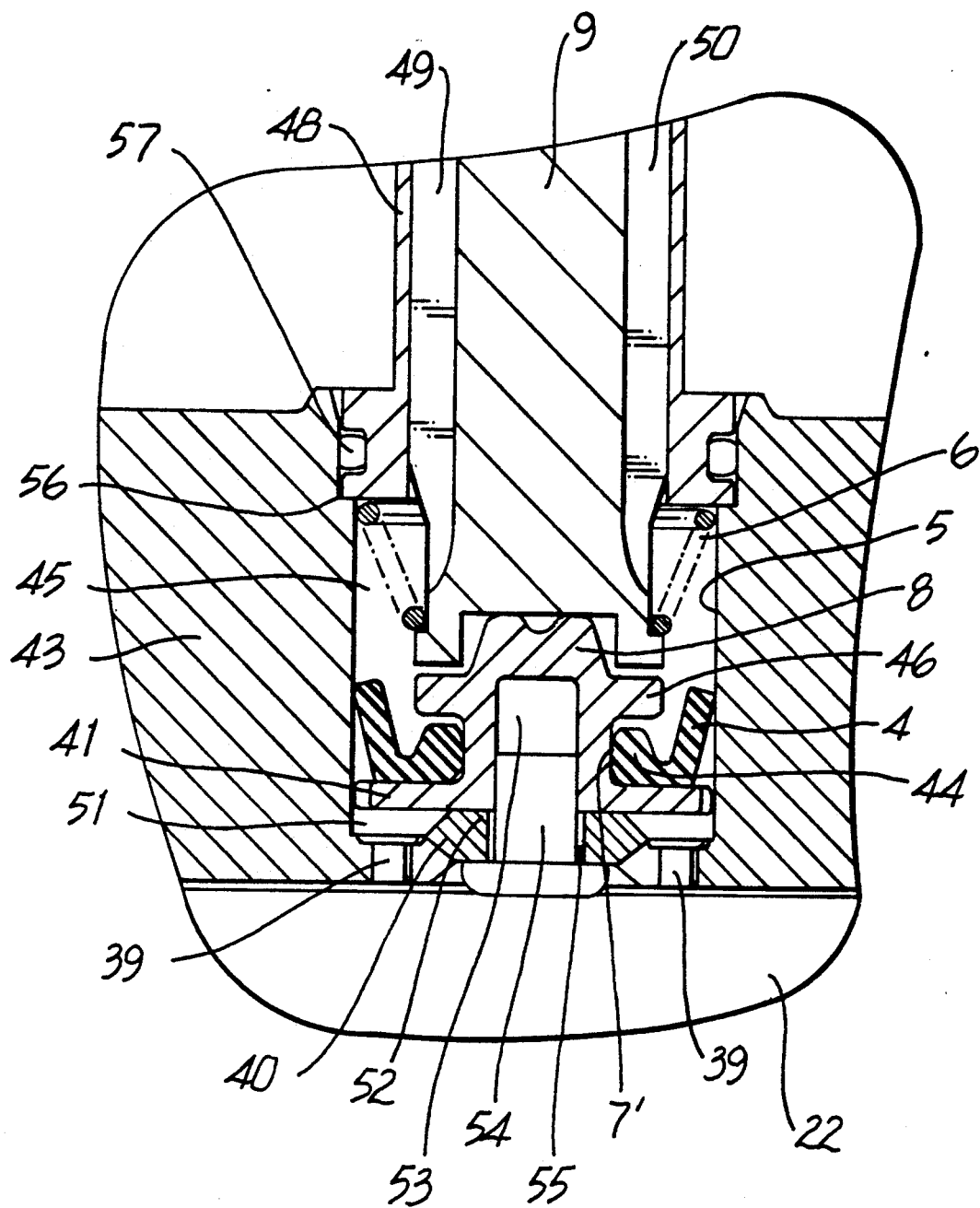
FIG. 2 shows on an enlarged scale a section of the solenoid-actuated inlet valve wherein an armature support and the return valve are combined into one structural unit.

FIG. 2 shows part of the armature (9) of the solenoid inlet valve (13, 9, 12, 11) and the armature support (8, 41, 7, 46) with Return valve (44, 4, 5, 8, 41, 7, 46) in an enlarged scale. For the sake of clarity, the components identical to those of FIG. 1 are given the same reference numbers.

FIG. 2 shows the armature (9) contained in an armature guide tube (48). The armature guide tube (48) is mounted in a gradation (56) of the wall (5) delimiting the recess (45) and is sealed by means of a sealing ring (57). The ribs (49, 50) on the armature (9) and extending in its longitudinal sense serve as the guides of the armature (9). A first set of channels (collectively shown as channel (10) in FIG. 1)) is formed by the wall of the armature guide tube (48) and the faces of a pair of ribs facing each other, whereby fluid under pressure goes from the control pressure circuit (3) (inlet chamber of the solenoid inlet valve (9, 11, 12, 13)) to the second channel (14) shown in FIG. 1, and from the latter over the third channel (18) into the control chamber (22), the solenoid inlet valve (9, 11, 12, 13) being open.

The armature (9) is held on the armature support (8, 41, 7, 46) by means of a spring (6) when the solenoid inlet valve (9, 11, 12, 13) is open. The armature support (8, 41, 7, 46) is installed in a recess (45) which is coaxial with the armature (9) and is provided in a wall (43) of the housing (1), as mentioned earlier. It rests with a ring-shaped element (41) on a rise (52) in the bottom (40) of the recess (45) so that the bottom (40) of the recess (45) and the side of the ring-shaped element (41) facing it form a ring chamber (51) which is connected to the control chamber (22) via the passages (39, 39') in the bottom (40). The ring-shaped element (41) is part of the armature support (8, 41, 7, 46) which is preferably made of extruded plastic.

The armature support (8, 41, 7, 46) is practically in the shape of a pot, its ring-shaped element (41) extending at a right angle to the longitudinal axis of the pot-shaped element (8) to the outside and resting on the rise (52) in the bottom (40) of the recess (45). The ring-shaped element (41) has a smaller diameter than that of the recess (45) receiving it so that control pressure fluid is able to go from the ring chamber (51) through the gap between the wall (5) delimiting the recess (45) and the circumferential surface of the ring-shaped element (41) and can reach the return valve (44, 4, 5, 8, 41, 7, 46).

An additional circular projection (46) extending radially outward is provided on the pot-shaped element (8). The side of the circular projection (46) which is turned towards the ring-shaped element (41) and the side of the ring-shaped element (41) turned towards the circular projection (46), together with a wall (7') of the pot-shaped element (8) constitute a groove (7) in which the groove ring (44, 4) is supported. The grooved ring (44, 4) is placed in the groove (7) formed by the ring-shaped element (41), the circular projection (46) and the wall (7') in such manner that it is tightly pressed in its free end zone by the surrounding outer circumference of its elastically ductile lip (4) against wall (5) of the recess (45). The part of the armature support (8, 41, 7, 46) turned towards the armature (9) is approximately crown-shaped. The armature (9) lies with its forward surface on this crown-shaped part and is held on the armature support (8, 41, 7, 46) by means of spring (6).

A rivet-like element (54) going through an opening (55) in the bottom (40) and which is pressed into a recess (53) of the armature support (8, 41, 7, 46) holds the armature support (8, 41, 7, 46) in the recess (45).

It is of course also possible to design the return valve so that a return element (sealing element), which may be an elastically ductile tab-like element for instance, is attached on the armature support and is located over a passage of said armature support.

The operation of the relay valve arrangement described above is explained in further detail below.

It is assumed that the relay valve arrangement and its control coupling (2) are connected to the pedal-operated brake valve, the pressure inlet linked to the pressure inlet chamber (38) is connected to a pressure supply container, and the pressure outlet (31) linked to the work chamber (42) is connected to the brake cylinder of a motor vehicle. Each brake cylinder of the motor vehicle is of course assigned such a relay valve arrangement which is configured in an identical manner.

At the beginning of the braking process, the valves and the relay piston of the relay valve arrangement are in the positions shown in FIG. 1. The solenoid inlet valve (9, 11, 12, 13) is in its open position, the outlet valve portion (20, 21, 17) of the combined solenoid inlet-and-outlet valve (17, 15, 47, 20, 21, 16) is in its closed position, the outlet valve portion (28, 29) of the combined inlet-and-outlet valve (28, 29, 30) of the relay valve is open and the inlet valve portion (29, 30) of the combined inlet-and-outlet valve (28, 29, 30) of the relay valve is closed.

The pressurized fluid which produces the control pressure passes from the pedal-operated brake valve into the control chamber (22) via the control coupling (2), the control pressure circuit (3) (inlet chamber of the solenoid inlet valve), the first channel (10), the open solenoid inlet valve (9, 11, 12, 13), the second channel (14), the open inlet valve portion (17, 15, 16) of the combined solenoid inlet-and-outlet valve (17, 16, 15, 20, 21, 16), and the third channel (18).

The control pressure building up in the control chamber (22) moves the relay piston (24) downward in the direction of the valve body (29) of the combined inlet-and-outlet valve (28, 29, 30) of the relay valve. At the same time, the outlet valve portion (28, 29) of the combined inlet-and-outlet valve (28, 29, 30) of the relay valve goes into closed position and the inlet valve portion (29, 30) of the combined inlet-and-outlet valve (28, 29, 30) is opened.

Operating pressure passes from the supply container (not shown) into the work chamber (42) of the relay valve via the pressure inlet chamber (38) and the now open inlet valve portion (29, 30) of the combined inlet-and-outlet valve (28, 29, 30) of the relay valve, and from there through the pressure outlet (31) to the brake cylinder. The vehicle is now decelerated by the responding brakes.

If the vehicle driver terminates the braking process before any locking tendency of the vehicle wheels appears, the control chamber (22) is deaerated via the third channel (18), the second channel (14), the inlet valve portion (17, 15, 16) of the combined solenoid inlet-and-outlet valve (17, 16, 15, 20, 21), the first channel (10), the control pressure circuit (3) (inlet chamber), the control coupling (2) and the upstream pedal-operated brake valve (not shown).

As a result of the then-occurring pressure difference between the dropping pressure in the control chamber (22) and the pressure in the work chamber (42), the relay piston (24) is pushed by the pressure in the work chamber (42) in the direction of the control chamber (22). At the same time the valve body (29) is moved by spring (35) in the direction of the inlet valve seat (30) and is pressed against the latter.

The inlet valve portion (29, 30) and the outlet valve portion (28, 29) of the relay valve are now closed. As the relay valve (24) continues to move in the direction of the control chamber, the valve seat (28) lifts away from the valve body (29) of the combined inlet-and-outlet valve (28, 29, 30) of the relay valve. The outlet valve (28, 29) is now open. The brake cylinder is deaerated into the atmosphere via pressure outlet (31), work chamber (42) and pressure outlet (32), causing the brakes to be deactivated.

If the braking process is not terminated by the vehicle driver, the solenoid inlet valve (9, 11, 12, 13) goes into closed position as soon as the control pressure circuit interacting with this relay valve arrangement recognizes that the wheel assigned to this relay valve arrangement shows a locking tendency.

After a brief phase during which pressure is maintained in the control chamber (22) as well as in the work chamber (42) and in the appertaining brake cylinder, the electronic control circuit transmits a signal to the solenoid outlet valve portion (20, 21, 17) of the combined solenoid inlet-and-outlet valve (17, 16, 15, 20, 21, 16) causing it to go into open position.

The control chamber (22) is deaerated into the atmosphere via the open solenoid outlet valve (20, 21, 17) and the pressure outlet (32). The pressure in the brake cylinder and thereby also the pressure in the work chamber (42) is let out into the atmosphere as described earlier by the outlet valve portion (28, 29) of the combined inlet-and-outlet valve (28, 29, 30) of the relay valve going into open position and the pressure outlet (32).

If the braking process is terminated by the vehicle driver during the pressure maintenance phase (solenoid inlet valve (9, 11, 12, 13) closed; solenoid outlet valve (20, 21, 16, 17) of the combined solenoid inlet-and-outlet valve (17, 16, 15, 20, 21, 16) closed), the control pressure circuit (3) and thereby also the inlet chamber of the solenoid inlet valve (9, 11, 12, 13) are deaerated via the control coupling (2) and the upstream pedal-operated brake valve.

Due to the then-occurring pressure differences between the pressure in the control chamber (22) and the pressure in the control pressure circuit (3) (inlet chamber of the solenoid inlet valve), the return valve (4, 44, 5, 8, 7, 41, 46) is brought by the pressure in the control chamber (22) into open position in the direction of the control pressure circuit (3). The pressure in the control chamber (22) now escapes through the open return valve (4, 44, 8, 7, 41, 46, 5) into the control pressure circuit (3), and from there via the control coupling (2) and the upstream pedal-operated brake valve into the atmosphere.

As long as the pressure in the control pressure circuit (3) and the pressure in the control chamber (22) are equal, or as long as the pressure in the control pressure circuit (3) is greater than the pressure in the control chamber (22), the return valve is held in closed position.

At variance with FIG. 2, the armature support (8, 41, 7, 46) according to FIG. 1 is not sitting on a rise in the bottom (40) delimiting the recess (45), but on a flat bottom (40) of recess (45). Also, the ring-shaped element (41) of the armature support (8, 41, 7, 46) does not extend over the entire passage (39) in the bottom (40) in this embodiment. The armature support (8, 41, 7, 46) is designed in such manner that at least a partial area of the face of armature (9) of the solenoid inlet valve (9, 11, 12, 13) turned towards the armature support (8, 41, 7, 46) is pushed by the control pressure in the direction of the solenoid inlet valve (9, 11, 12, 13), causing the closing of the solenoid inlet valve (9, 11, 12, 13) to be accelerated. The side of the armature support (8, 41, 7, 46) facing the armature (9) of the solenoid inlet valve (9, 11, 12, 13) is provided for that purpose with a smaller profile than the side of the armature (9) facing this side. The armature support (8, 41, 7, 46) can be in the form of a crown on its side towards the armature (9).

Instead of a combined solenoid inlet-and-outlet valve (17, 16, 15, 20, 21), it is also possible to provide a simple solenoid outlet valve (17, 20, 21) so that the control valve consists of a solenoid inlet valve (9, 11, 12, 13) and a solenoid outlet valve (17, 16, 20, 21).

Figure 3:
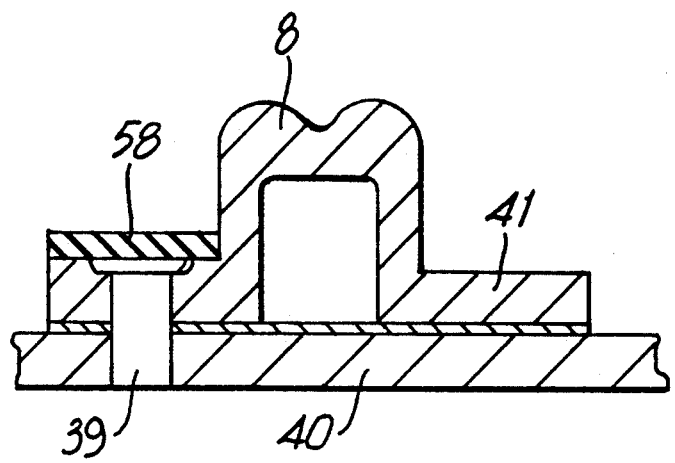
FIG. 3 schematically shows another embodiment of the inventive relay valve arrangement.

The return valve can of course also be of a design other than that shown in FIGS. 1 and 2. For example, as shown in FIG. 3, it could be formed by an elastically ductile, tab-like element (58) and the passage (39) in the bottom (40) of the recess (45), whereby the tab-like element (58) is attached to the armature support or on the bottom (40) of the recess (45) and covers the passage (39). A passage in part of the armature support and a sealing element actively connected to this passage can constitute yet another embodiment of the return valve. In such case a sealing device must be provided between the armature support and the wall (40) with the passage (39) so that the control chamber (22) and the control pressure circuit (3) (inlet chamber of the solenoid inlet valve) may be connected to each other via the return valve and not via a gap between the armature support and the wall holding or receiving same.

Figure 4:
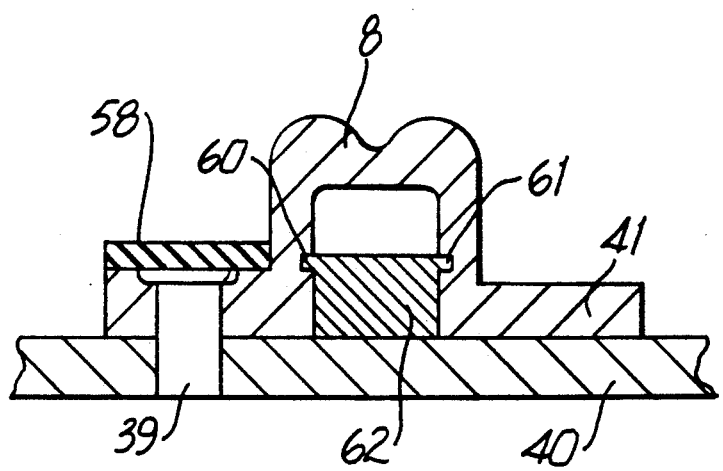
FIG. 4 schematically shows a further embodiment of the inventive relay valve arrangement.

The armature support for the armature of the solenoid inlet valve of the relay valve arrangement can of course also be connected to the wall (40) of the relay valve arrangement by means of snap-in connections. As shown in FIG. 4, the snap-in connections may consist of a pin (62) with a head, for example, which is provided with projections (61) on its end extending into a recess (60) of the armature support, said projections engaging corresponding recesses in the armature support.

Figure 5:
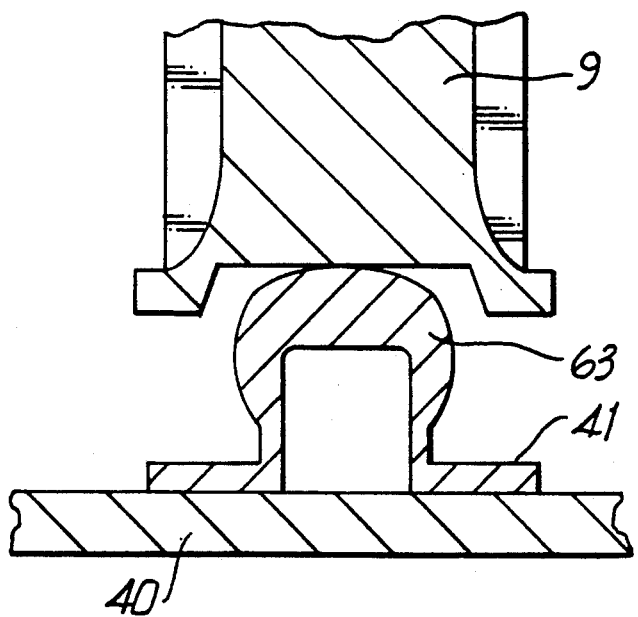
FIG. 5 schematically shows yet another embodiment of the inventive relay valve arrangement.

As shown in FIG. 5, the free end of the armature support facing towards the armature can also be in the form of a ball (63). In this manner a minimal support surface is created for the armature on the armature support.

While the invention has been described by reference to specific embodiments, this was for purposes of illustration only. Numerous alternative embodiments will be apparent to those skilled in the art and are considered to be within the scope of the invention.

I claim:

1. A relay valve arrangement comprising
   a relay valve,
   a source of control pressure which delivers said control pressure to a control pressure circuit, a control chamber which receives said control pressure from said control pressure circuit and thereby determines a configuration for said relay valve, a control valve through which said control pressure is delivered to said control chamber, said control valve including a solenoid-actuated inlet valve and a solenoid-actuated outlet valve, said solenoid-actuated inlet valve including an armature, and a return valve connecting said control chamber to said control pressure circuit in parallel with said control valve so as to by-pass said control valve when the control pressure in said control chamber is greater than the control pressure in said control pressure circuit, wherein said armature of said solenoid-actuated inlet valve rests on a portion of said return valve when said solenoid-actuated inlet valve is in an open position so that said portion of said return valve constitutes an armature support for said armature of said solenoid-actuated inlet valve.

2. The relay valve arrangement of claim 1 wherein said return valve including said armature support is coaxial with said armature.

3. The relay valve arrangement of claim 1 wherein aid return valve comprises a grooved ring seal disposed about said portion of said return valve which constitutes said armature support, said ring seal including an elastically ductile lip which sealingly presses against a wall which surrounds and is spaced from said armature support.

4. The relay valve arrangement of claim 3 wherein said ring seal comprises an elastomeric material.

5. The relay valve arrangement of claim 1 wherein said armature support comprises a non-metallic material.

6. The relay valve arrangement of claim 1 wherein said return valve comprises a tab-like sealing element on said armature support positioned to cover a passage leading to said control chamber.

7. The relay valve arrangement of claim 1 further comprising snap-in connecting means for connecting said armature support to a wall containing a passage from said control chamber to said control pressure circuit.

8. The relay valve arrangement of claim 7 wherein said snap-in connecting means comprises a pin having a head on which are projections which engage with indentations in said armature support.

9. The relay valve arrangement of claim 7 wherein said armature support includes a free end in the form of a ball located opposite said armature.

10. The relay valve arrangement of claim 1 further comprising means for biasing said armature of said solenoid-actuated inlet valve toward said portion of said return valve constituting said armature support.

* * * * *